(12) United States Patent
Griffith et al.

(10) Patent No.: US 7,374,302 B2
(45) Date of Patent: May 20, 2008

(54) DEFORMABLE MIRROR

(75) Inventors: Michael S Griffith, Chelmsford (GB);
Nicholas J Archer, Chelmsford (GB);
Leslie C Laycock, Chelmsford (GB)

(73) Assignee: Bae Systems plc, London (GB)

( * ) Notice: Subject to any disclaimer, the term of this patent is extended or adjusted under 35 U.S.C. 154(b) by 0 days.

(21) Appl. No.: 10/537,898

(22) PCT Filed: Dec. 18, 2003

(86) PCT No.: PCT/GB03/05555

§ 371 (c)(1),
(2), (4) Date: Jun. 7, 2005

(87) PCT Pub. No.: WO2004/057407

PCT Pub. Date: Jul. 8, 2004

(65) Prior Publication Data

US 2006/0103956 A1    May 18, 2006

(30) Foreign Application Priority Data

Dec. 23, 2002 (GB) ................ 0230038.2
Apr. 30, 2003 (GB) ................ 0309976.9

(51) Int. Cl.
*G02B 5/08* (2006.01)

(52) U.S. Cl. ..................... 359/849; 359/846

(58) Field of Classification Search ............ 359/847, 359/290, 819, 846, 871, 849
See application file for complete search history.

(56) References Cited

U.S. PATENT DOCUMENTS

| | | | |
|---|---|---|---|
| 3,904,274 A * | 9/1975 | Feinleib et al. ......... 359/295 |
| 3,972,600 A | 8/1976 | Cobarg | |
| 4,239,343 A | 12/1980 | Wrench | |
| 4,655,563 A * | 4/1987 | Plante et al. ........... 359/849 |
| 4,733,945 A * | 3/1988 | Bacich .................. 359/820 |
| 5,801,891 A | 9/1998 | Lloyd | |
| 6,048,070 A * | 4/2000 | LaFiandra ............. 359/846 |
| 6,236,490 B1 * | 5/2001 | Shen .................... 359/247 |
| 6,307,688 B1 * | 10/2001 | Merz et al. ............ 359/819 |
| 6,388,823 B1 * | 5/2002 | Gaber et al. ........... 359/819 |
| 6,398,373 B1 | 6/2002 | Guzman et al. | |
| 6,425,671 B1 | 7/2002 | Adler et al. | |

FOREIGN PATENT DOCUMENTS

| | | |
|---|---|---|
| EP | 0 743 541 A1 | 11/1996 |
| EP | 0 793 120 A | 9/1997 |
| JP | 61-285424 | 12/1986 |
| WO | 95/21394 | 8/1995 |
| WO | 02/12948 A2 | 2/2002 |
| WO | 03/016976 A2 | 2/2003 |

OTHER PUBLICATIONS

International Search Report of PCT/GB03/05555 mailed Apr. 27, 2004.

(Continued)

*Primary Examiner*—Jordan Schwartz
*Assistant Examiner*—James C Jones
(74) *Attorney, Agent, or Firm*—Nixon & Vanderhye P.C.

(57) ABSTRACT

This invention relates to a hybrid deformable mirror. A deformable mirror is provided comprising a reflective surface provided on a substrate and a layer of deformable material attached to the substrate that is operable to deform the mirror and wherein the substrate is supported by an actuator that is operable to deform the mirror.

24 Claims, 6 Drawing Sheets

OTHER PUBLICATIONS

EP Search Report of EP 02 25 8826 dated May 22, 2003.
GB Search Report of GB 0309976.9 dated Sep. 16, 2003.
GB Search Report of GB 0230038.2 dated Mar. 4, 2003.

A. V. Ikramov et al., "Bimorph Adaptive Mirror", Soviet Journal of Quantum Electronics, American Institute of Physics, vol. 22, No. 2, Feb. 1, 1992, pp. 163-166, XP000273608.

* cited by examiner

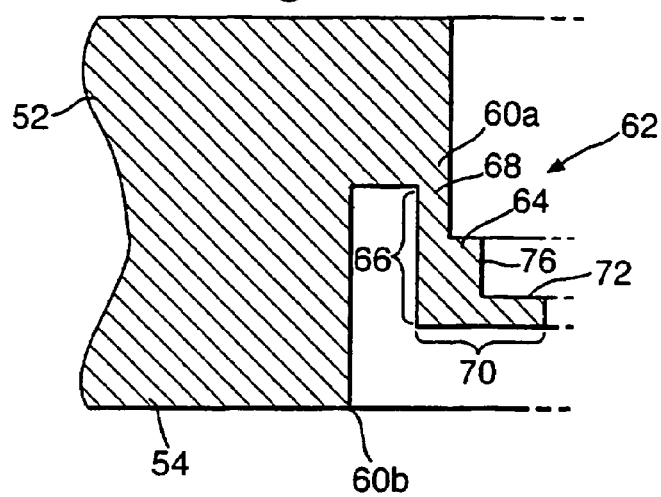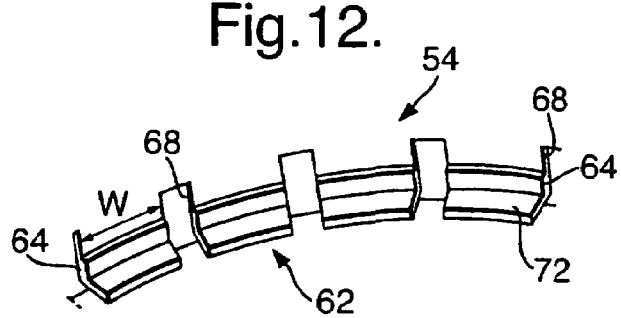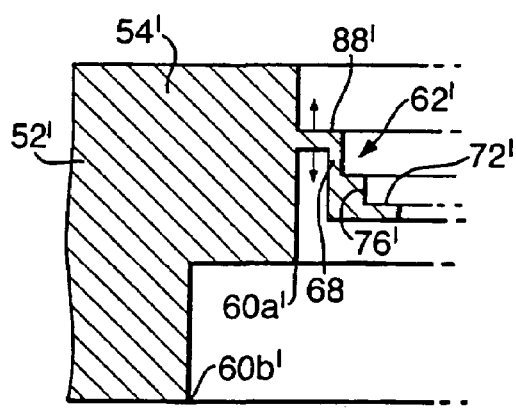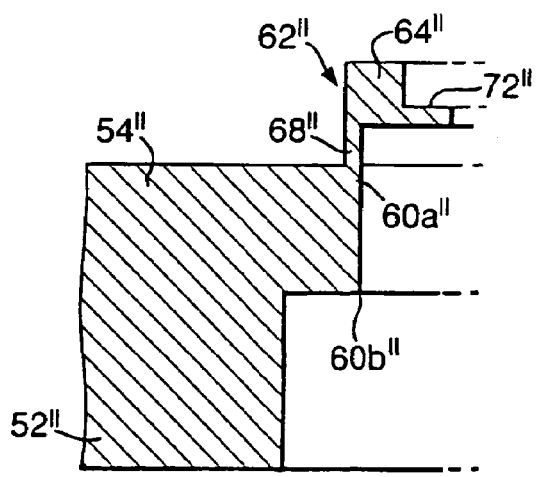

DEFORMABLE MIRROR

This application is the U.S. national phase of international application PCT/GB2003/005555, filed 18 Dec. 2003, which designated the U.S. and claims priority of GB 0230038.2, filed 23 Dec. 2002, and GB 0309976.9, filed 30 Apr. 2003, the entire contents of each of which are hereby incorporated by reference.

This invention relates to a deformable mirror. In particular, this invention relates to a hybrid deformable mirror and is particularly well-suited to large deformable mirrors that may be used in applications such as astronomical telescopes and high resolution imaging.

Deformable mirrors are often used in the field of adaptive optics. For example, phase distortions in a signal may be sensed by a wavefront sensor and these distortions may be corrected for by deforming an adaptive mirror. Such adaptive mirrors may be employed in numerous fields, including:

imaging, for example adaptive mirrors are used in astronomy to improve the resolution of earth-based telescopes that are otherwise affected by atmospheric distortions;

laser sensing, where the amount of laser light that can be delivered onto a target is significantly increased by using an adaptive mirror to correct for atmospheric distortions—this enables either better information to be obtained or objects to be identified at a greater range; and laser generation, where an adaptive mirror can be used intracavity within a high power laser to counter the thermal blooming that can be otherwise induced by the high concentration of laser light inside the cavity.

Phase distortions can be corrected conveniently by reducing the distortions into characteristic Zernike modes. Zernike created a polynomial power series that provides a mathematically convenient way to describe the phase of an optical beam. Each term of the expansion includes a coefficient multiplied by a mathematical expression which represents a potential form of aberration, e.g. focus, coma or astigmatism. Increasing terms or modes are increasingly complex. For example, the first two Zernike modes are associated with tip-tilt. These modes can be filtered off and processed to provide the control signals for a separate tip-tilt mirror. The third Zernike mode often relates to focus. The focus and other higher order modes can then be processed to provide control signals for the deformable mirror.

To date, deformable mirrors use one or other of two alternative deformation mechanisms. The first is a class of mirrors called zonal mirrors. This class of mirrors is based on a number of discrete piezoelectric actuators attached directly to a deformable mirror. Each actuator in a zonal mirror can be used to deform an area of the mirror directly above it.

The second is a class of mirrors that generally comprise a substrate bonded to an active element. The active element is controlled such that the mirror is made to deform to adopt a desired shape, for example a convex shape, and this in turn causes the substrate to bend to the same shape. The active element is usually a piezoelectric material bonded to a substrate using an epoxy resin. The mirror can either have a single layer of piezoelectric material bonded to the substrate (strictly speaking a unimorph), or can be a dual piezoelectric layer with the two pieces poled in opposite directions (this is a true bimorph).

For smaller mirrors, bonded piezoelectric elements (e.g bimorph deformable mirrors) are preferred due to their relatively low cost. Such mirrors provide an adequate balance between bandwidth and stroke. However, the balance between bandwidth and stroke is especially important when looking to make larger mirrors e.g. mirrors with active apertures greater than 10 to 15 cms. In order to keep the resonant frequency and thus the bandwidth of the mirror constant, the thickness of the substrate must also increase. For the larger mirrors this will adversely affect the minimum curvature available from the mirror. For this reason, larger mirrors have historically been zonal mirrors. The fact that the substrate is supported by a large number of actuators means that the resonant frequency, and therefore bandwidth, is no longer directly linked to the mirror diameter. However, the overriding issue with this type of deformable mirror is the cost. Although there are a number of different actuator technologies available, none of them are cheap. This makes large mirrors expensive because as many as 300 actuators may be required. For a bonded piezoelectric element mirror, although a large peizoelectric element will be more expensive than a smaller one, the cost differential will not be as great. A second issue is that it is not always possible to place discrete actuators as close to each other as required because of their fairly large size.

Against this background, and from a first aspect, the present invention resides in a deformable mirror comprising: a passive substrate layer having a reflective surface provided thereon; a first layer of actively deformable material, attached to the passive substrate layer, that is operable to deform the mirror as a result of transverse expansion or contraction of the material under the influence of a field applied across its thickness; and an actuator coupled to one of said layers that is operable to further deform the mirror. The actuator can be used to provide the basic deformation required of the mirror (e.g. focus), while the deformable material can be used to provide fine tuning of the mirror shape. In this arrangement, the substrate no longer needs to be supported from the edge and so the resonance frequency and bandwidth is increased over and above what it would be for a purely edge-supported device. This means it is possible to concentrate on optimising the design of the deformable material to give the maximum curvature with less constraint from the resonance effects.

Preferably, the deformable mirror comprises a plurality of actuators that support the substrate. Optionally, the actuators are arranged to be operable to correct lower order Zernike modes. Preferably, the layer of deformable material is segmented, the segments being arranged to be operable to correct higher order Zernike modes. Optionally, the deformable material comprises peizoelectric material. Preferably, the actuator comprises magnetostrictive or electrostrictive material.

From a second aspect, the invention resides in a method of correcting phase variations in a beam of electromagnetic radiation incident upon a deformable mirror described above, wherein the actuator or actuators are moved to correct Zernike modes at or below a threshold order and the first and/or second layer or layers of actively deformable material is/are moved to correct Zernike modes above the threshold order. Other preferred, but optional, features of the invention are set out in the appended claims.

In order that the invention can be more readily understood, reference will now be made, by way of example only, to the accompanying drawings in which.

Figure 9:
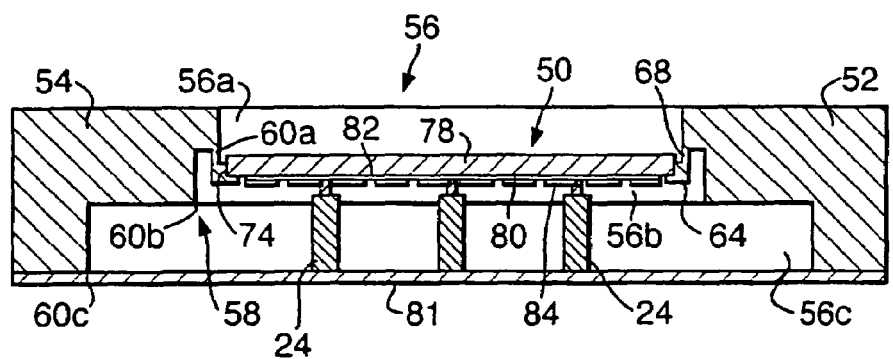
FIG. 9 is a cross-section through line IX-IX of FIG. 8 showing the mirror in a relaxed state.
Figure 10:
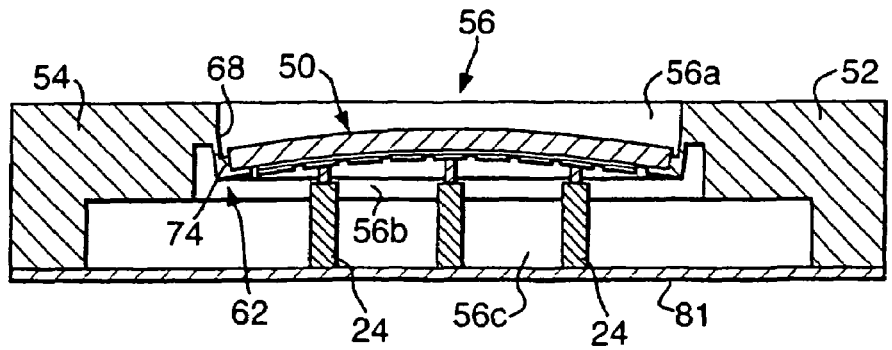
Figure 15:
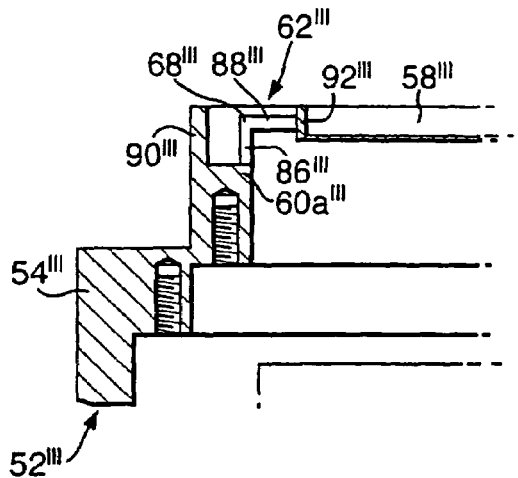
Figure 16:
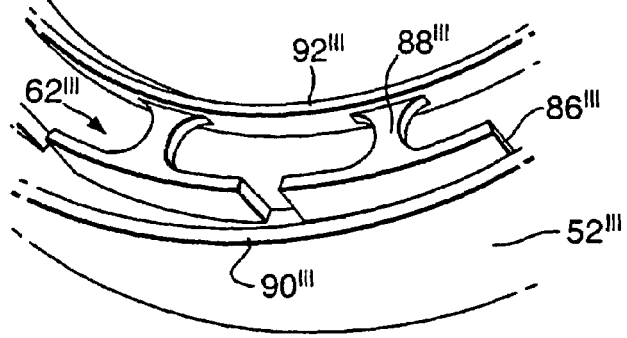
Figure 17:
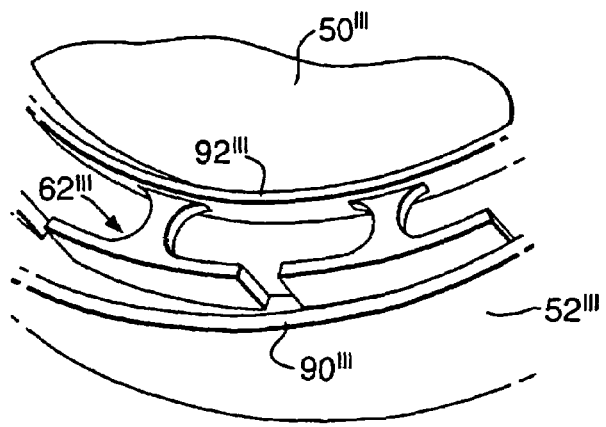

FIG. 10 corresponds to FIG. 9 but with the mirror in a state of deformation;

FIG. 11 is a detail from FIG. 9;

FIG. 12 is a perspective view of part of the mount of FIG. 9;

FIG. 13 corresponds to FIG. 11 but for a seventh embodiment of the present invention;

FIG. 14 corresponds to FIG. 11 but for a eighth embodiment of the present invention;

FIG. 15 is a cross-sectional view of a ninth embodiment of the present invention;

FIG. 16 is a perspective view of part of the mount of FIG. 15, with the mirror removed;

FIG. 17 is a further perspective view of a part of the mount of FIG. 15, with the mirror in place.

In all embodiments described herein, the mirror 10 comprises a copper substrate 14 whose outer face 16 provides a reflecting surface by virtue of a series of thin dielectric coatings provided on the outer surface 16 (not shown). At least one active piezoelectric element 18 is bonded to the substrate 14 using epoxy resin 20. An array of electrodes 22 are used to activate the piezoelectric element(s) 18. Applying a potential to the electrodes 22 causes the piezoelectric element(s) 18 to deform so that, in turn, the substrate 14 deforms to create a mirror 10 with a desired shape, convex for example. In order to enable the stress induced by the piezoelectric element 18 to be coupled effectively to the substrate 14, the epoxy resin 20 should be as thin as possible. However, if the resin 20 is to be very thin, it must also be uniform. If the epoxy resin 20 is too thick there will be unnecessary loss of coupling efficiency; if the epoxy resin 20 is too thin, the sheer strength of the glue will be compromised. This is of course true for all embodiments of the present invention illustrated herein. In a further embodiment of the invention, glass spacers (normally used in the manufacture of liquid crystal devices) are interposed between the substrate 14 and the piezoelectric element 18 thereby enabling a uniformly thin layer of epoxy resin 20 to be achieved between the substrate 14 and the piezoelectric element 18.

In addition, each embodiment includes at least one actuator fabricated 24 from magnetostrictive or electrostrictive material. The actuators 24 are attached at one end to a base 25 of a mount 26 and, at its other end, either to the piezo-electric element 18 or directly to the substrate 14. Applying a potential to the actuator 24 causes it to expand or contract thereby deforming the substrate 14 and hence the mirror 10.

Figure 1:
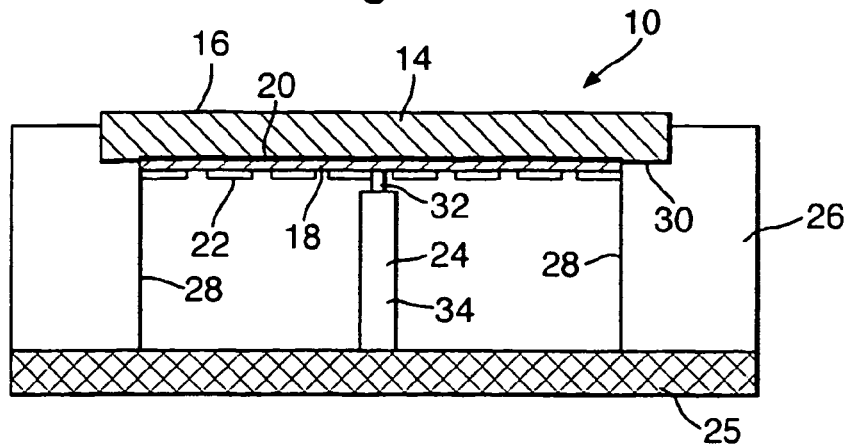
FIG. 1 is a cross-sectional view through the centre of a deformable mirror according to a first embodiment of the present invention.

Turning first to the embodiment of FIG. 1, the mirror 10 is firmly secured around its periphery to a mount 26. The mirror 10 is disc-shaped and the mount 26 is cylindrical with a circular aperture in the centre of its top, the aperture being sized and shaped to receive the mirror 10. The internal sides 28 of the mount 26 are stepped so as to provide a shoulder 30 for seating the mirror 10.

In this first embodiment, a single actuator 24 is rigidly bonded to both the base 25 and the centre of the piezoelectrical element 18. The actuator 24 is in the shape of an elongate cylinder and is stepped to form a narrowed head 32 at its top. In this particular embodiment, only the Zernike mode for focus needs to be filtered out and so a single actuator 24 placed at the centre of the mirror 10 is sufficient to meet this requirement.

Further embodiments of the present invention will now be described. The embodiments are very similar and so corresponding parts have been assigned corresponding reference numerals and will not be described again in order to avoid unnecessary repetition.

Figure 2:
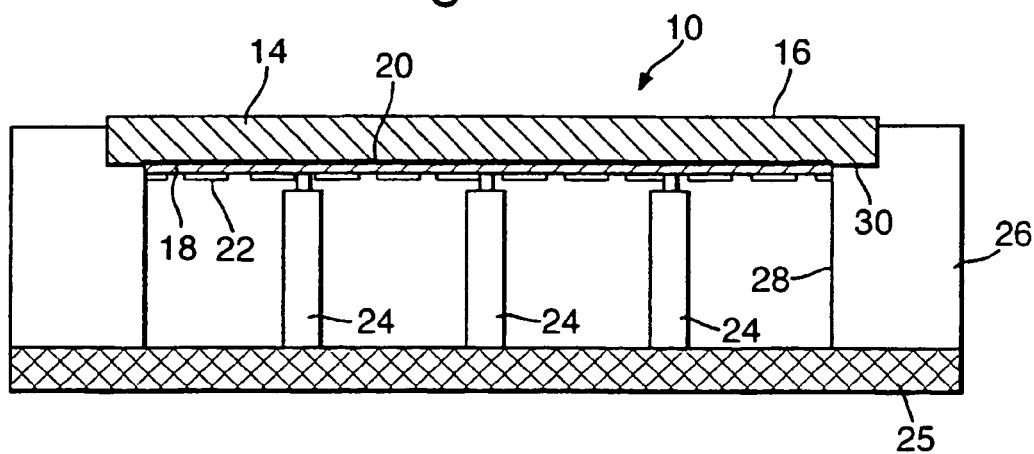
FIG. 2 is a cross-sectional view through the centre of a deformable mirror according to a second embodiment of the present invention.

A second embodiment of the present invention is shown in FIG. 2. In common with the embodiment of FIG. 1, this second embodiment has a mirror 10 firmly secured around its periphery to a mount 26, and also has a central actuator 24 bonded between the mirror substrate 14 and the mount's base 25. Moreover, the second embodiment differs in that it has a further six actuators 24 (of corresponding design to the central actuator 24) arranged concentrically halfway along six equispaced radii of the mirror 10. Assuming that the first two Zernike modes are already filtered off to provide the control for a tip-tilt mirror, the seven actuators 24 are used to correct for distortions associated with the next few Zernike modes, whilst the piezoelectric element 18 is used to correct for distortions associated with all the remaining higher order Zernike modes.

Figure 3:
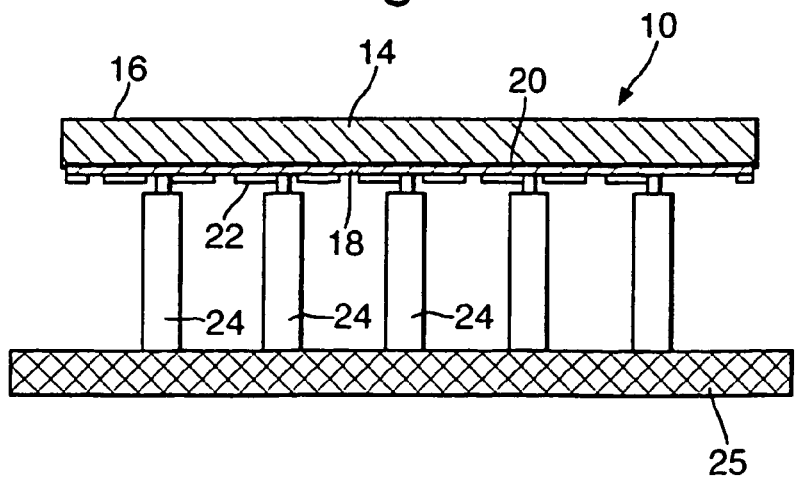
FIG. 3 is a cross-sectional view through the centre of a deformable mirror according to a third embodiment of the present invention.

FIG. 3 shows a third embodiment of the present invention in which there are a larger number of actuators 24 supporting the mirror. With this many actuators 24, there is no longer any need to support the mirror 10 round its edge. With the edge of the mirror 10 free to move, there will be fewer constraints on the mirror deformation around its edge. However, the piezoelectric element 18 can provide fine control of mirror deformation, and this helps to keep the number of actuators 24 required to a minimum (this minimum will be dictated by the bandwidth that is required from the mirror 10).

Figure 4:
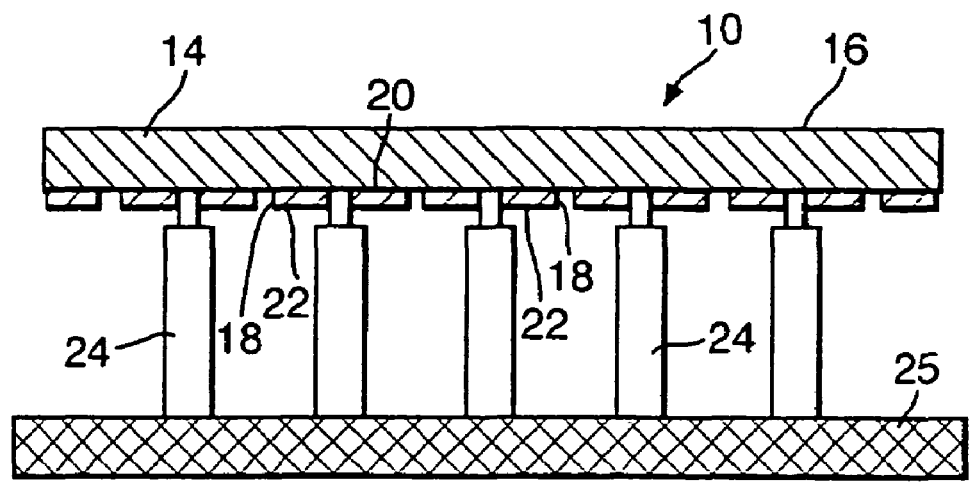
FIG. 4 is a cross-sectional view through the centre of a deformable mirror according to a fourth embodiment of the present invention.

In the example shown there are a total of thirteen actuators 24 arranged as follows: there is a single central actuator 24 surrounded by two concentric rings of six actuators 24. The rings are placed one third and two thirds of the way along the radius of the mirror 10 and the actuators 24 within the rings are arranged such that they are paired to sit on a common radius. FIG. 4 shows a further embodiment of the present invention that is very similar to the third embodiment. It differs in that rather than having a single piezoelectric element 18 to which the actuators 24 are bonded, the piezoelectric material 18 is segmented into an array of piezoelectric elements 18. An advantage of this approach is that the overall size of the mirror 10 is not limited by the size of monolithic piezoelectric element 18 available. Again, the individual elements 18 can be made of either a single piezoelectric layer, a bimorph structure or multilayer elements. However, in order to take full advantage of a multilayer piezoelectric element, contact should be made to the electrode 22 in each layer. Furthermore, gaps are left between piezoelectric elements 18 so that the actuators 24 can be attached directly to the mirror's substrate 14. The advantage of this arrangement is that the actuators 24 can be screwed into the back of the mirror's substrate 14, thereby providing a very strong attachment.

Actuators 24 can be screwed directly into the substrate 14 even where a monolithic piezoelectric element 18 is used, as follows. Holes are punched through the monolithic piezoelectric element 18 using an ultrasonic drill where the actuator 24 needs to pass through.

Figure 5:
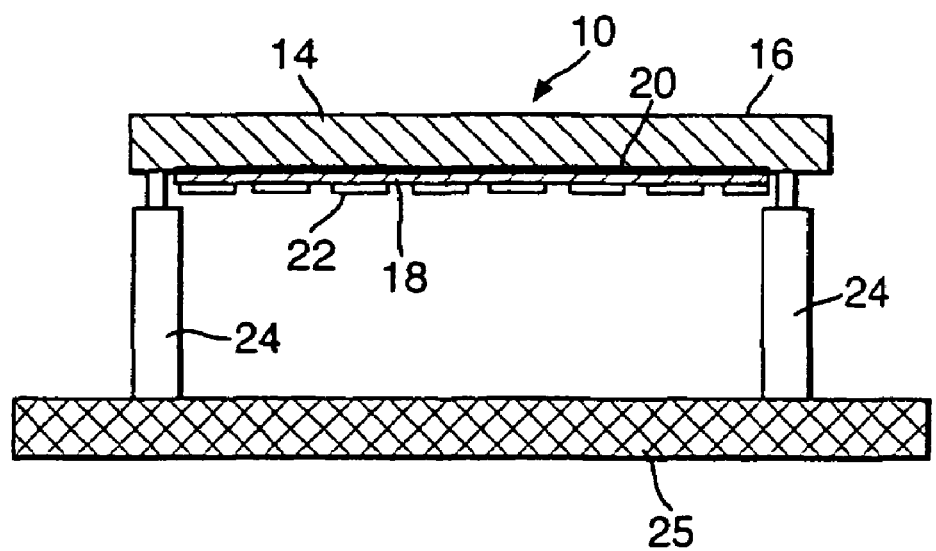
FIG. 5 is a cross-sectional view through the centre of a deformable mirror according to a fifth embodiment of the present invention.
Figure 6:
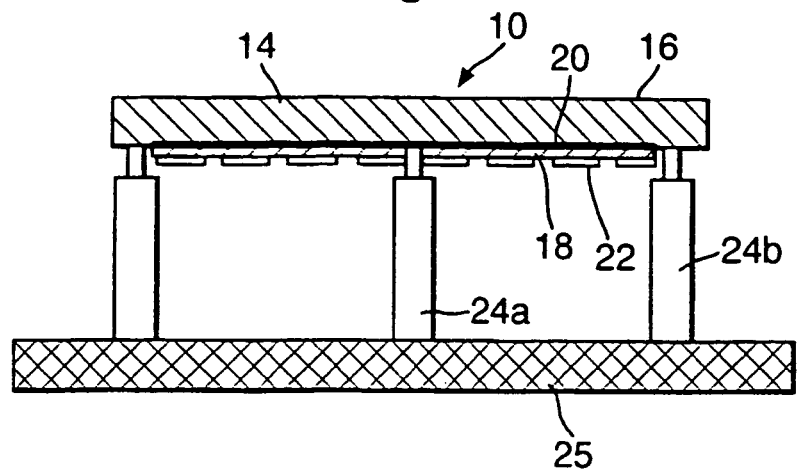
FIG. 6 is a cross-sectional view through the centre of a deformable mirror akin to that of FIG. 5.
Figure 7A:
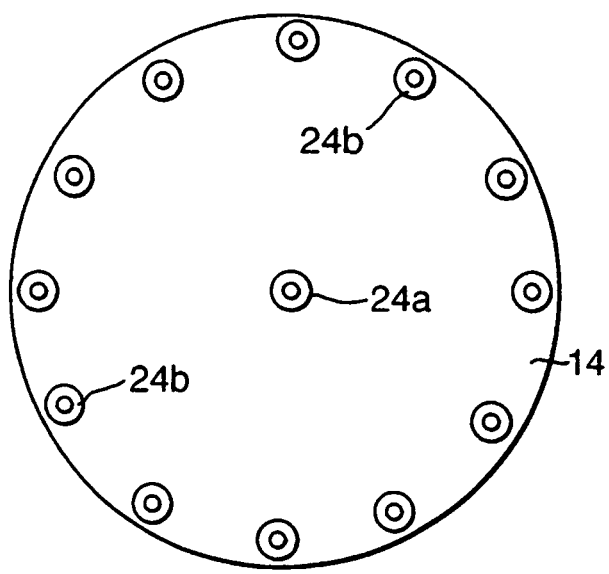
FIG. 7a shows in plan-form the arrangements of actuators on the deformable mirror of FIG. 6.
Figure 7B:
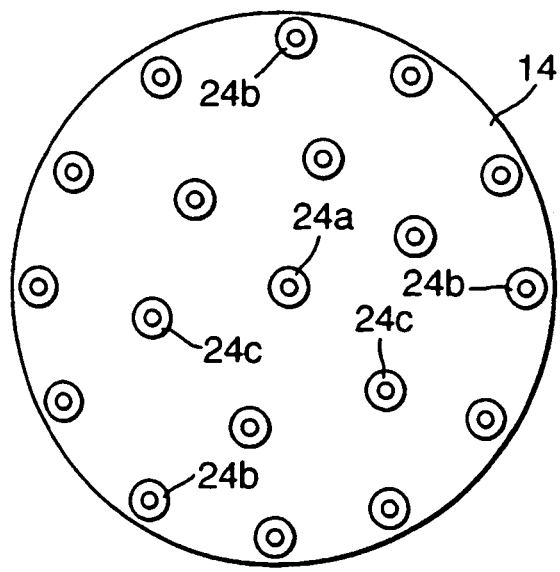
FIG. 7b shows in plan-form an alternative arrangement of actuators on a deformable mirror.
Figure 8:
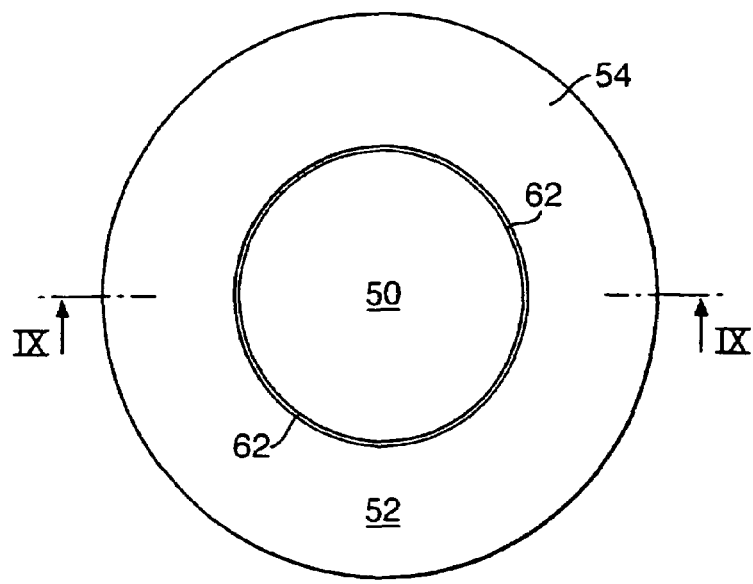
FIG. 8 is a plan view of a deformable mirror and a mount according to a sixth embodiment the present invention.

In a fifth embodiment shown in FIG. 5, twelve actuators 24 are used to support the mirror 10 around its edge. In this embodiment, a piezoelectric element 18 is used to provide the deformations required for the main part of the mirror 10, while the actuators 24 are used to provide the correct boundary conditions at the edge of the mirror 10. An alternative, but broadly similar, arrangement is shown in FIGS. 7a. This arrangement differs only in that a central actuator 24a has been added in addition to twelve actuators 24b arranged around the edge of the mirror 10. The outer actuators 24b may be used to provide the correct boundary conditions for the mirror 10, whilst the central actuator 24a may be used to correct for focus (the third Zernike mode). All higher Zernike modes can be corrected using the piezoelectric element 18. FIG. 7b shows a slightly modified arrangement: an intermediate ring of six actuators 24c have been added between the central actuator 24a and the twelve outer actuators 24b. The intermediate actuators 24c may be used with the central actuator 24a for control of low order distortions.

A deformable bimorph mirror 50 and a mount 52 according to a sixth embodiment of the present invention are shown in FIGS. 8 to 12. The mount 52 is a unitary structure made from stainless steel. The mount 52 comprises a round body 54 that defines a central circular aperture 56. The aperture 56 is shaped and sized to receive the disc-shaped deformable bimorph mirror 50 therein. Hence, the mirror 50 is held in a protected position within the mount 52.

Whilst the outer edges of the mount's body 54 are regular, the internal edges 58 are stepped to form a series of three interconnected and concentric circular apertures 56a-c that increase in size from top to bottom. The stepped inner profile 58 of the mount 52 produces a series of three shoulders 60a-c. Twenty generally L-shaped flexible beams 62 extend downwardly in cantilever fashion from the topmost 60a of these shoulders 60a-c. The twenty beams 62 are of identical size and shape and are equispaced around the circular topmost shoulder 60a. The beams 62 are L-shaped such that they extend downwardly from the topmost shoulder 60a before turning through 90° to extend inwardly towards the centre of the middle aperture 56b. Rather than having a pure L-shape, a square-shaped support shoulder 64 extends from the internal corner of each beam 62 as best seen in FIG. 11. The support shoulder 64 only extends partially up the height of the upright portion 66 of the beam 62, thereby leaving a narrow neck 68 in the portion of the beam 62 that bridges the topmost shoulder 60a of the mount body 54 and the support shoulder 64 of the beam 62. It is this neck 68 that gives the beam 62 its flexibility, i.e. this neck 68 can be deformed to allow the beam 62 to deflect and bend. The length and thickness of the neck 68 of the beams 62 are chosen to achieve the desired flexing properties. FIG. 12 shows four of the beams 62 in perspective and indicates the width W of the beams 62 relative to their separation. It is the relative width of the beams 62 that gives the required degree of stiffness in the plane of the mirror 10.

The inwardly-extending portion 70 of the beam 62 extends beyond the support shoulder 64 to provide an upwardly-facing support surface 72 for receiving the mirror 50. The mount 52 and the beams 62 are sized such that the mirror 10 may be received within the beams 62 to be supported from below by the support surfaces 72 and so that the mirror's edge 74 fits snugly against the upright face 76 of the support shoulders 64. Hence, the mirror 50 is held firmly in place.

The mirror 50 is best seen in FIG. 9 and corresponds to the mirrors described previously. To recap, the mirror 50 comprises a copper substrate 78 whose outer face provides a reflecting surface by virtue of a series of thin dielectric coatings provided on the outer surface (not shown). An active piezoelectric element 80 is bonded to the non-reflective side copper substrate 78 using epoxy resin 82. An array of forty-five electrodes 84 are used to activate the piezoelectric element 80. The mirror 50 is also supported from below by an array of seven magnetostrictive actuators 24 that extend between a base cap of the mount 52 and a lower surface of the mirror 50 where they attach as described previously. Applying a potential to the electrodes 84 and the actuators 24 cause the piezoelectric element 80 and the actuators 24 to deform so that, in turn, the copper substrate 78 deforms, as shown in FIG. 10. This creates a convex-shaped mirror 50.

As the mirror 50 deforms, it remains firmly held in place against the support surface 72 and support shoulder 64 because the beam 62 deflects with the mirror 10 by flexing about its neck 68, as shown in FIG. 10. Moreover, the beams 72 offer minimal resistance to the mirror 50 as its peripheral edge 74 rotates towards the mirror axis. This is because they have minimal stiffness radially and so require little force to deform radially towards the mirror centre. The mass and stiffness of the beams 62 are very small in comparison to that of the mirror 50 and therefore the beams 62 have minimal impact upon the mirror 50 deformation. In addition, the relatively large width W of the beams 62 provides stiffness in all directions in the plane of the mirror and torsionally about the mirror axis. The short length of the beams 62 provides stiffness in the axial direction.

FIG. 10 shows that convex deformation of the mirror 50 extends to the very edge 74 of the mirror 50 and hence eliminates virtually all dead space from the mirror 50. Hence, the active area of the mirror 50 covers virtually the whole of the mirror 50. This is highly beneficial because a mirror mount 52 that prevents rotation of the mirror's peripheral edge 74 would need to be twice the diameter to obtain a similar convex active area and would have a first mode resonant frequency of half that of the simply supported mirror 50 of the present invention. Thus, the present invention allows for a mirror 50 of much smaller size to be used to obtain the same stroke/bandwidth product.

The person skilled in the art will appreciate that modifications can be made to the embodiments described hereinabove without departing from the scope of the invention.

Use of unimorph, bimorph or multilayer piezoelectric elements 18 can be freely varied according to need in any of the embodiments. In addition, the type of actuators 24 used may be varied in each embodiment. Suitable types of actuators 24 include magnetostrictive, electrostrictive, piezoelectric, electromagnetic, hydraulic, mechanical or electromechanical. An example of an electrostrictive material is PMN (lead magnesium nitrate).

The arrangement of actuators 24 given herein are merely examples of preferred configurations and may be varied without departing from the scope of the invention. Moreover, many types of standard configurations of piezoelectric elements 18; 80 can be used in order to obtain the desired deformation of the mirror 10; 50. In particular, the choice of using a monolithic piezoelectric element 18; 80 or an array of discrete piezoelectric elements 18; 80 can be made for each of the embodiments shown.

Details of the mirror 10; 50 and how it is arranged to deform are given as useful background in which to set the context of the present invention, but are not essential to the invention. Other mirror configurations can be equally well accommodated by the present invention.

Whilst one of the above embodiments uses L-shaped beams 62, strict compliance with this shape is not necessary. For example, the support shoulders 64 may be omitted and the peripheral edge of the mirror 74 may abut against the upright face of the beam 62. This arrangement would lead to a longer neck 68 that could flex along its entire height. In addition, the beam 62 could be J-shaped rather than being L-shaped. This may be advantageous where the mirror 50 has rounded edges rather than square edges. In fact, the beam 62 may be shaped to conform to any profile the mirror 50 may have, e.g. to conform to chamfered edges.

Furthermore, the beams 62 need not necessarily extend downwardly from the mount body 54 to house the mirror 50 within the mount body 54. An alternative arrangement is shown in FIG. 13, that broadly corresponds to the view shown in FIG. 11 and so like reference numerals have been used for like parts but with the addition of a prime. In this embodiment, the flexible neck 68' is L-shaped such that, in addition to the flexible upright portion 86' that allows deflection as the mirror 50 deforms, there is a horizontal portion 88' that connects the upright portion 86' to the mount body 54. The horizontal portion 88' of the beam 62' allows vertical movement of the edges of the mirror 50, as indicated by the arrows in FIG. 13. This is beneficial because the mirror 50 may be deformed to adopt shapes that require relative movement around the edge 74 of the mirror 50, e.g. to adopt radially-extending ridges and troughs thereby creating an undulating mirror edge 74.

A further alternative arrangement of the beams 62 is shown in FIG. 14 where beams 62" extend upwardly from the mount body 54' (like reference numerals are used for like parts, the double prime denoting the parts that belong to the embodiment of FIG. 14). Most importantly they retain the flexible neck 68" that allows the beam 62" to bend with the mirror (not shown) as it adopts a convex shape.

A yet further embodiment is shown in FIGS. 15 to 17. Again, like reference numerals are used for like parts, the triple prime denoting the parts that belong to the embodiment of FIGS. 15 to 17. In this embodiment, the mirror 50''' is supported at the top of the mount 52'''. The mount 52''' has an outer wall 90''' extending from the outer edge of its top surface. Twenty flexible beams 62''' extend from the inner edge 60$a$''' of the mount 52'''. The flexible beams 62''' comprise an L-shaped flexible neck 68''' that extends from the mount 52''' first upwardly as an upright portion 86''' before turning through 90° to extend inwardly as a horizontal portion 88'''. The horizontal portion 88''' of each of the flexible beams 62''' meets a unitary L-shaped annular ring 92''' that is shaped and sized to receive the mirror 50'''. The L-shape of the ring 92''' is such that it supports the mirror 50''' from the side and from below.

The advantage of this arrangement is that the shape of the flexible beams 62''' allows vertical movement of the mirror's edge. This provides additional enhancement by further minimising the ratio of the total diameter of the mirror 50''' to the active diameter. This reduces the overall mirror diameter required to achieve a given stroke for a set applied voltage and bandwidth by virtually eliminating any dead space from the outside of the mirror 50'''.

As will be appreciated by the skilled person, other arrangements of the beams 62 are possible. For example, the flexible beams 62 could extend inwardly to meet a supporting end of the beam 62. Essentially, any arrangement could be used where the supporting end of the beam 62 is connected to the mount body 54 by a flexible neck 68 that allows the supporting end to bend as the mirror 50 deforms.

Whilst the mount 52 of the above embodiments is made from stainless steel, many other materials such as other metals, plastics, glasses or ceramics could be used instead.

The invention claimed is:

1. A deformable mirror comprising:
    a passive substrate layer having a reflective surface provided thereon;
    a first layer of actively deformable material, said first layer having a thickness and attached to the passive substrate layer for deforming the mirror as a result of transverse expansion or contraction of the deformable material under the influence of a field applied across said thickness; and
    a linear actuator coupled to one of said layers for further deforming the mirror.

2. A deformable mirror according to claim 1, wherein the first layer of actively deformable material is bonded to the passive substrate layer.

3. A deformable mirror according to claim 1, comprising a second layer of actively deformable material bonded to the first layer of actively deformable material.

4. A deformable mirror according to claim 1, comprising a plurality of linear actuators, each of said actuators coupled to one of said layers.

5. A deformable mirror according to claim 4, wherein the linear actuators correct lower order Zernike modes.

6. A deformable mirror according to claim 1, wherein the first layer of actively deformable material is segmented and the segments are arranged to correct higher order Zernike modes.

7. A deformable mirror according to claim 1, wherein the first layer of actively deformable material comprise piezoelectric material and the field is an electric field.

8. A deformable mirror according to claim 1, wherein said linear actuator is coupled directly to the passive substrate layer through one aperture in the first layer of actively deformable material.

9. A deformable mirror according to claim 1, wherein the linear actuator is comprise of one of magnetostrictive and electrostrictive material.

10. A deformable mirror holder for a deformable mirror according to claim 1, wherein the holder comprises a body with a central aperture for receiving the deformable mirror, the central aperture being defined by a plurality of flexible beams, with each flexible beam having an end shaped to provide a supporting surface and a flexible portion that connects an end of the beam to the body.

11. A deformable mirror holder according to claim 10, wherein the ends of the flexible beams are co-joined to form a unitary structure shaped to provide a supporting surface.

12. A deformable mirror holder according to claim 10, wherein the ends of the beams lie in the plane of the body of the holder such that, in use, the deformable mirror is received within the body of the holder.

13. A deformable mirror holder according to claim 10, wherein at least one beam is generally L-shaped such that one leg of the L-shape provides the flexible portion and the other leg of the L-shape provides the supporting surface of the end of the beam.

14. A deformable mirror holder according to claim 13, wherein the internal corner of the L-shaped beam has a shoulder that extends part of the way along both legs of the L-shape.

15. A deformable mirror holder according to claim 10, wherein the plurality of flexible beams are arranged around the entire aperture.

16. A deformable mirror holder according to claim 15, wherein the width of the beams is larger than the separation between beams.

17. A deformable mirror holder according to claim 16, wherein the width of the beams is greater than four times the separation between beams.

18. A deformable mirror holder according to claim 13, wherein the peripheral edge of the deformable mirror is supported from below by one leg of an L-shaped beam and is supported from the side by the other leg of the L-shaped beam.

19. A deformable mirror holder according to claim 14, wherein the peripheral edge of the deformable mirror is supported from below by one leg of the L-shaped beam and is supported from the side by an inwardly-facing side of the shoulder.

20. A method of correcting phase variations in a beam of electromagnetic radiation incident upon a deformable mirror according to claim 1, wherein the actuator is moved to correct Zernike modes at or below a threshold order and the first layer of actively deformable material is moved to correct Zernike modes above the threshold order.

21. A method according to claim 20, wherein the actuator is moved to correct the first and second order Zernike modes and the deformable material is moved to correct third and higher order Zernike modes.

22. A new deformable mirror according to claim 3, wherein the at least one of said first and second layers is segmented and the segments are arranged to correct higher order Zernike nodes.

23. A deformable mirror according to claim 22, wherein the linear actuator is coupled directly to the passive substrate layer by means of at least one aperture in the first and second layers.

24. A new method of correcting phase variation in a beam of electromagnetic radiation incident upon a deformable mirror according to claim 3, wherein the linear actuator is moved to correct Zernike modes at or below a threshold order and the layers of deformable material are arranged to correct Zernike modes above the threshold order.

* * * * *